June 10, 1930.  J. JAROSZ  1,763,621
DIRIGIBLE HEADLIGHT FOR AUTOMOBILES
Filed Dec. 31, 1928  2 Sheets-Sheet 1
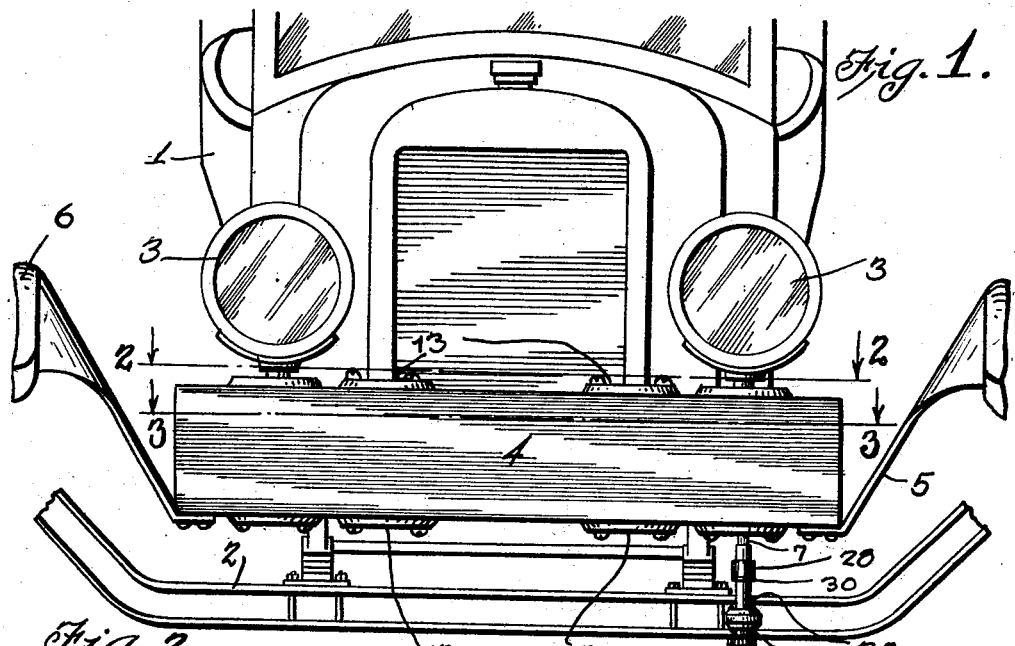
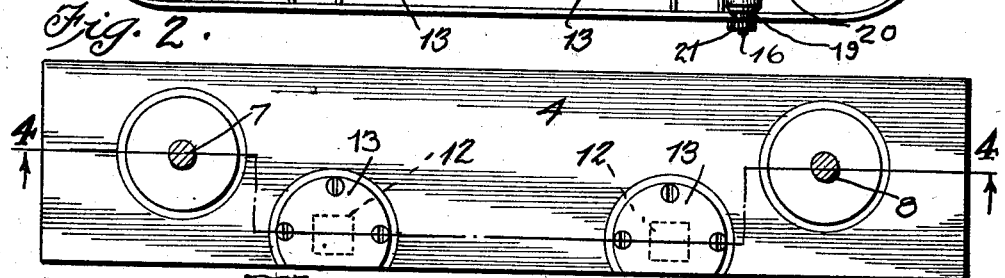
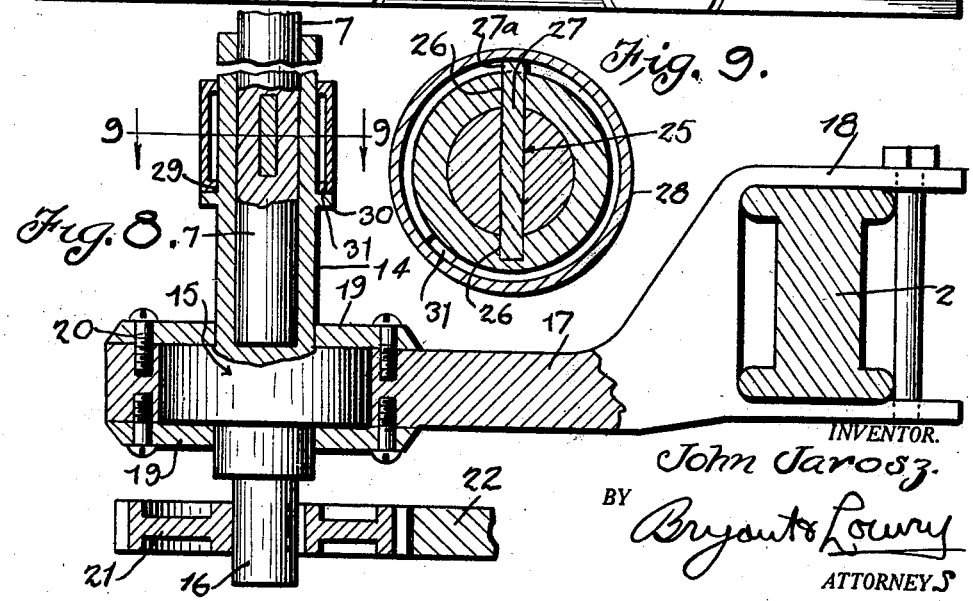
INVENTOR.
John Jarosz.
BY Bryant & Lowry
ATTORNEYS

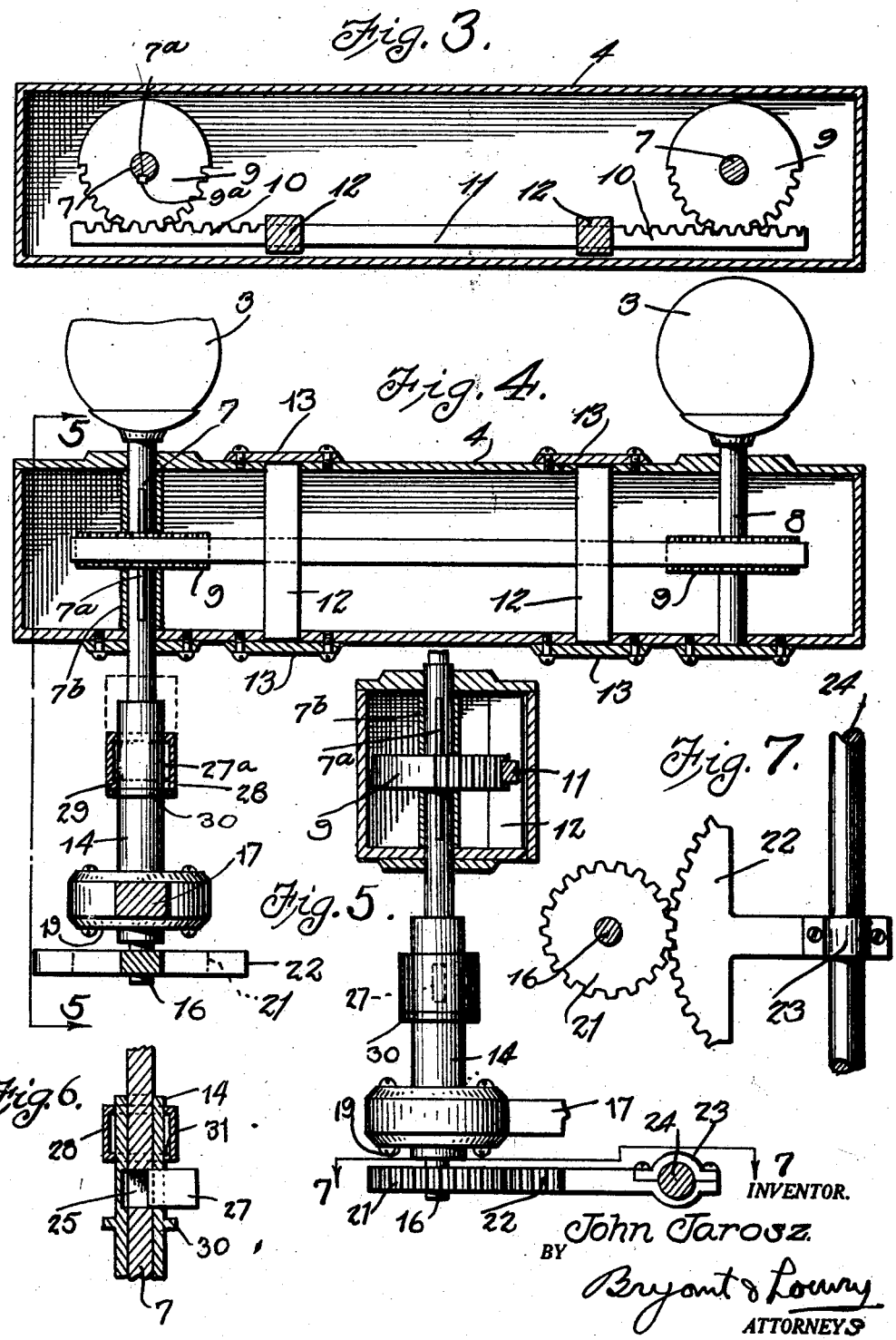

Patented June 10, 1930

1,763,621

UNITED STATES PATENT OFFICE

JOHN JAROSZ, OF CENTRAL FALLS, RHODE ISLAND, ASSIGNOR OF ONE-THIRD TO ROMUALD HULL, OF CENTRAL FALLS, RHODE ISLAND, AND OF ONE-THIRD TO JOHN A. PIKOR, OF CENTRAL FALLS, RHODE ISLAND

DIRIGIBLE HEADLIGHT FOR AUTOMOBILES

Application filed December 31, 1928. Serial No. 329,637.

This invention relates to certain new and useful improvements in dirigible headlights for automobiles, and has for one of its objects to associate movably mounted headlights with the steering mechanism of the automobile so that when the front steering wheels are turned to either the right or left, the headlights of the automobile will be located in a corresponding direction for directing the rays of light directly forwardly of the automobile.

Another object of the invention is to provide dirigible headlights for automobiles wherein a journaled post supporting a headlight has operative connection with the steering mechanism of the automobile with rack and pinion mechanism forming communication with another journaled headlight post for effecting simultaneous operation thereof.
A still further important object of the invention is to provide dirigible headlights for automobiles in which the connection between the steering mechanism of the automobile and a rotatable post supporting one of the headlights may be destroyed or disconnected so that the steering mechanism may operate independently of the headlights with the latter remaining stationary.

With the above and other objects in view that will become apparent as the nature of the invention is better understood, the same consists in the novel form, combination and arrangement of parts hereinafter more fully described, shown in the accompanying drawings and claimed.

In the drawings:—

Figure 1 is a fragmentary front elevational view of an automobile equipped with the improved dirigible headlight mechanism;
Figure 2 is a horizontal sectional view taken on line 2—2 of Figure 1, showing the oblong casing into which the rotatable posts for supporting the lamps extend;

Figure 3 is a horizontal sectional view taken on line 3—3 of Figure 1, showing the casing enclosing the operating mechanism extending between the two lamp carrying posts;

Figure 4 is a vertical longitudinal sectional view taken on line 4—4 of Figure 2, showing one of the lamp supporting posts depending from the casing for operative connection with the steering mechanism of the automobile. the lamp supporting posts being illustrated as composed of two sections with a locking device for securing them together, but is shown in releasing position by dotted lines;

Figure 5 is a vertical cross-sectional view taken on line 5—5 of Figure 4, showing the connection between the lamp supporting post and steering mechanism;

Figure 6 is a detail sectional view showing the locking connection between the two sections of the lamp carrying post;

Figure 7 is a detail sectional view taken on line 7—7 of Figure 5, showing the rack and pinion connection between the lamp supporting post and steering mechanism;

Figure 8 is an enlarged detail sectional view of the lower end of the lamp supporting post showing the bracket mounting upon the automobile axle and locking devices between the two posts or sections; and Figure 9 is a detail sectional view taken on line 9—9 of Figure 8.

Referring more in detail to the accompanying drawings, the reference numeral 1 designates the automobile body supported upon a chassis comprising a front axle bar 2 with a headlight or lamp 3 located at each side of the automobile radiator as shown in Figure 1. A box-like casing of oblong formation and rectangular in cross-section designated by the reference numeral 4 is supported at its ends upon the adjacent edges of the side wings 5 of the fenders or mud guards 6, the casing 4 having the posts 7 and 8 for supporting the lamps 3 journaled in the top and bottom walls thereof as clearly shown in Figure 4. Each of the rotatably mounted posts 7 and 8 carries a horizontal gear wheel 9, the gear wheel upon the shaft 8 being suitably anchored thereto between the top and bottom walls of the casing while both gear wheels are engaged by the rack portions 10 on opposite ends of a rack bar 11. The gear wheel 9 upon the shaft 7 has a spline connection therewith, the gear having a lug or key 9ª extending into the groove 7ª in the post 7, the gear being maintained midway the upper and lower sides of the casing 4 by the collars 7ᵇ, to retain the same engaged with the adjacent rack portion 10 of the rack bar 11. Posts 12 are mounted in the casing 4 through openings in the top and bottom walls thereof and retained in position by the cap plates 13, each post 12 having an opening therein for the passage of the slidably mounted rack bar 11. The rack bar 11 is rectangular in cross-section while the openings in the post 12 are of similar configuration to maintain the rack portions 10 in line with the gear wheels 9 upon the lamp posts 7 and 8.

The post 7 is operatively engaged with the steering mechanism of the automobile and when rotated communicates motion to the lamp post 8 through the medium of the slidably mounted rack bar 11. The lamp post 7 extends downwardly below the casing 4 and is rotatably received in the tubular bearing 14, carried by the cylindrical head 15 while the stub shaft 16 depends from the head 15. The cylindrical head 15 is rotatably mounted in the outer end of a bracket 17 that is clamped as at 18 to the front axle bar 2, the head 15 being rotatable in a bearing opening in the outer end of the bracket 17 and retained therein by the upper and lower retaining plates 19 secured to the bracket 17 by the fastening devices 20. The stub shaft 16 extending below the cylindrical head 15 has a pinion 21 keyed thereto that meshes with a segment 22 that is attached as at 23 to a cross rod 24 of the steering mechanism.

A detachable connection is provided between the lower end of the lamp post 7 and the tubular bearing 14 so that the headlights or lamps of the automobile may be disconnected from the steering mechanism and such detachable connection includes a provision of a cross slot 25 in the post 7 within the tubular bearing 14 that is adapted to register with diametrically opposite openings in said tubular bearing to receive a key 27 for locking the post to the tubular bearing as illustrated in Figure 9. A vertically slidable sleeve 28 is mounted upon the tubular bearing 14 and has an inwardly directed annular flange 29 upon its lower end that rests upon the annular shoulder 30 of the tubular bearing 14, said annular flange 29 having a cut away portion 31 to ride over the projecting end 27ᵃ of the key 27 and when rotated to assume the position shown in Figure 9, presents the closed portion of the flange 29 below the projecting end 27ᵃ of said key to prevent upward sliding movement of the sleeve 28. With the key and sleeve so disposed, the post 7 is locked to the tubular bearing 14 and when the steering wheels of the automobile are shifted by the steering mechanism, motion is communicated to the post 7 and through the rack bar 11 to the companion post 8 for shifting the lamps 3 in the desired direction, casting light rays forwardly of the automobile. In order to remove the key 27, it is necessary to rotate sleeve 28 to position the flange 29 in line with the projecting edge 27ᵃ of the key and at which time the sleeve 28 may be raised as shown by dotted lines in Figure 4 to permit removal of the key. The sleeve 28 is then lowered and rests upon the shoulder 30, while the lamps 3 remain stationary during shifting movement of the steering mechanism. The manner of inserting and removing the key 27 is illustrated in Figure 6.

While there is herein shown and described the preferred embodiment of the present invention, it is nevertheless to be understood that minor changes may be made therein without departing from the spirit and scope of the invention as claimed.

I claim:—

A dirigible headlight mechanism for automobiles comprising a casing secured to the body part of the vehicle, a pair of lamp holding posts rotatably mounted in said casing, one of said posts extending vertically through and below said casing, a tubular member mounted on the axle of the vehicle, in which said extending post has its bearing means for interlocking said extension, and said bearing, and for disconnecting the same, said tubular member being operatively connected with the steering mechanism of the vehicle, said downwardly extended post and tubular bearing being formed with transverse slots adapted to be brought into coincidence, a key insertable in said slots to interlock said post and bearing member and a slidable and rotatable sleeve embracing said bearing member and preventing dislodgement of said key, the said sleeve having a flange at its lower end, notched for the passage of the head of the key, the said tubular member being formed with a flange to limit the movement of the sleeve vertically.

In testimony whereof I affix my signature.

JOHN JAROSZ.